United States Patent
Peterson et al.

(10) Patent No.: US 9,953,218 B2
(45) Date of Patent: Apr. 24, 2018

(54) AUTOMATIC CAMERA ADJUSTMENT FOR TEXT DOCUMENTS

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/330,878

(22) Filed: Jul. 14, 2014

(65) Prior Publication Data

US 2016/0014349 A1   Jan. 14, 2016

(51) Int. Cl.
| | |
|---|---|
| *G06K 9/00* | (2006.01) |
| *H04N 5/232* | (2006.01) |
| *G06K 9/18* | (2006.01) |
| *G03B 13/36* | (2006.01) |

(52) U.S. Cl.
CPC ........... *G06K 9/00442* (2013.01); *G06K 9/18* (2013.01); *H04N 5/23212* (2013.01); *H04N 5/23222* (2013.01); *G03B 13/36* (2013.01); *G06K 2209/01* (2013.01)

(58) Field of Classification Search
CPC ............. H04N 5/2628; H04N 5/23222; H04N 5/23212; H04N 5/23216; G06T 2219/2012
See application file for complete search history.

(56) References Cited

U.S. PATENT DOCUMENTS

| | | | | |
|---|---|---|---|---|
| 6,011,531 A * | 1/2000 | Mei | ........................ | G09G 3/20 345/90 |
| 6,301,440 B1 * | 10/2001 | Bolle | ................. | G06K 9/00664 348/229.1 |
| 2003/0086615 A1 * | 5/2003 | Dance | ................ | G06K 9/00456 382/200 |
| 2008/0273796 A1 * | 11/2008 | Kansal | ................... | G06K 9/325 382/176 |
| 2011/0194750 A1 * | 8/2011 | Nepomniachtchi | ...... | G06K 9/36 382/137 |

* cited by examiner

*Primary Examiner* — Ahmed A Berhan
(74) *Attorney, Agent, or Firm* — Kunzler, PC

(57) ABSTRACT

For automatically adjusting camera settings responsive to photographic subject matter, an apparatus is disclosed. The apparatus includes an image sensor, a processor, an image module that receives sensor input of photographic subject matter, a subject matter module that identifies a nature of the photographic subject matter, and a configuration module that alters a camera setting, in response to determining the nature of the photographic subject matter. In some embodiments, the apparatus also includes an image center module that identifies a central region of the sensor input, wherein the subject matter module performs, on the central region of the sensor input, one or more analyzes selected from the group consisting of: optical character recognition, facial recognition, color distribution analysis, and light level analysis.

20 Claims, 5 Drawing Sheets

AUTOMATIC CAMERA ADJUSTMENT FOR TEXT DOCUMENTS

FIELD

The subject matter disclosed herein relates to automatic camera adjustment and more particularly relates to automatically adjusting camera setting for photographs of text documents.

BACKGROUND

Description of the Related Art

When taking a picture, users generally have their camera or mobile device set to a specific resolution. Additionally, most users usually have their camera resolution set to maximum resolution, which creates much larger photos that take up space on their device and cloud shares. Currently users can modify their resolution settings each time they go to take a picture, however users don't always know how to modify these settings, or will accidentally leave the camera at the wrong setting for future photos.

BRIEF SUMMARY

An apparatus for automatically adjusting camera settings responsive to photographic subject matter is disclosed. A method and computer program product also perform the functions of the apparatus.

The apparatus for automatically adjusting camera settings responsive to photographic subject matter may include an image sensor, a processor, an image module that receives sensor input of photographic subject matter, a subject matter module that identifies a nature of the photographic subject matter, and a configuration module that alters a camera setting, in response to determining the nature of the photographic subject matter.

In some embodiments, the apparatus also includes a manual event module that receives a shutter input, wherein the subject matter module identifies the nature of the photographic subject matter in response to the manual event module receiving the shutter input. In some embodiments, the apparatus also includes an automatic event module that receives an auto-focus indication, wherein the subject matter module identifies the nature of the photographic subject matter in response to receiving the auto-focus indication.

In some embodiments, the apparatus also includes a progressive resolution module that reduces a resolution by an initial amount and determines whether text in the sensor input is computer readable, wherein the progressive resolution module reduces the resolution by an additional amount in response to the text document being computer readable and increases the resolution in response to the text not being computer readable.

In some embodiments, the apparatus also includes a user notification module that prompts a user to allow alteration of the camera setting, wherein the configuration module alters the camera setting in response to the user allowing alteration of the one of an image property and a camera setting.

In some embodiments, the apparatus also includes an image center module that identifies a central region of the sensor input, wherein the subject matter module performs, on the central region of the sensor input, one or more analyses selected from the group consisting of: optical character recognition, facial recognition, color distribution analysis, and light level analysis.

The method for automatically adjusting camera settings responsive to photographic subject matter may include receiving, by use of a processor, sensor input of photographic subject matter; determining a nature of the photographic subject matter; and altering one of an image property and a camera setting, in response to determining the nature of the photographic subject matter.

In some embodiments, the method also includes receiving a shutter input, wherein the nature of the photographic subject matter is determined in response to receiving the shutter input. In some embodiments, the method also includes receiving an auto-focus indication, wherein the nature of the photographic subject matter is determined in response to receiving the auto-focus indication.

In some embodiments, the method also includes prompting a user to allow alteration of the one of an image property and a camera setting, in response to the nature of the photographic subject matter being a text document; and altering one of an image property and a camera setting, in response to the user allowing alteration of the one of an image property and a camera setting.

In certain embodiments, altering one of an image property and a camera setting includes reducing a resolution in response to the nature of the photographic subject matter being a text document. Reducing a resolution may include reducing a resolution by an initial amount, determining whether the text document is computer readable, reducing the resolution by an additional amount in response to the text document being computer readable, and increasing the resolution in response to the text document not being computer readable.

In certain embodiments, determining the nature of the photographic subject matter includes performing optical character recognition on at least a portion of the sensor input and identifying a the photographic subject matter as being a text document in response to successfully recognizing characters in the sensor input. In certain embodiments, performing optical character recognition on at least a portion of the sensor input comprises identifying a central region of the sensor input; and performing optical character recognition on the central region.

In certain embodiments, altering one of an image property and a camera setting comprises altering an image property selected from the group consisting of: an image resolution, an image color scheme, and an image file size. In certain embodiments, altering one of an image property and a camera setting comprises altering a camera setting selected from the group consisting of: a camera resolution, a camera color setting, an output file size, and an output file type.

In certain embodiments, determining the nature of the photographic subject matter comprises performing, on at least a portion of the sensor input, one or more analyses selected from the group consisting of: facial recognition, color distribution analysis, and light level analysis.

The computer program product for automatically adjusting camera settings responsive to photographic subject matter may include a computer readable storage medium that stores code executable by a processor to perform: receiving sensor input of photographic subject matter, prompting a user to allow alteration of an image property or a camera setting, determining a nature of the photographic subject matter, in response to the user allowing alteration of the image property or camera setting, and altering the image property or the camera setting, in response to determining the nature of the photographic subject matter.

In some embodiments, the computer program product also includes code for identifying a central region of the sensor input, wherein determining a nature of the photographic subject matter comprises performing, on the central region of the sensor input, one or more analyses selected from the group consisting of: optical character recognition, facial recognition, color distribution analysis, and light level analysis. In certain embodiments, altering the image property or the camera setting comprises reducing a resolution in response to the nature of the photographic subject matter being a text document.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
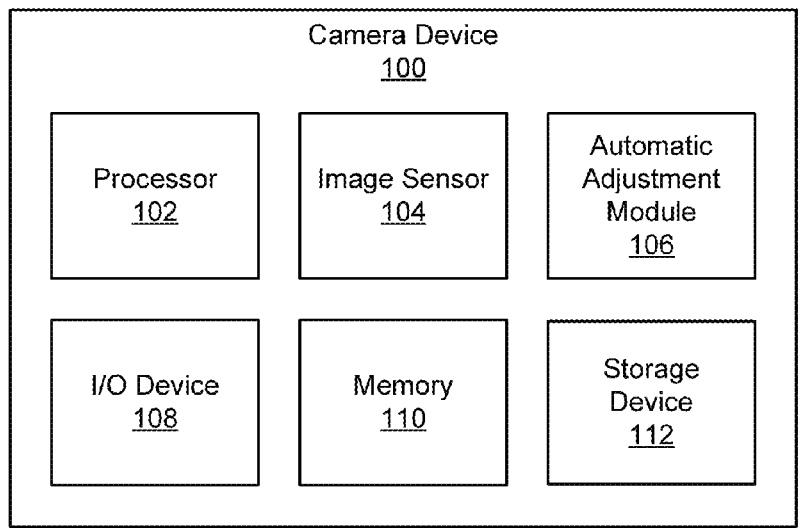
FIG. 1 is a schematic block diagram illustrating one embodiment of a system for automatically adjusting camera settings responsive to photographic subject matter.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, digital photographs of text documents are perfectly legible at lower resolutions. Lower resolution digital photographs require less storage space allowing a user to take more digital photographs on a memory card. Disclosed are systems, methods, apparatuses, and computer program products for recognizing if a digital photograph is mostly text or non-text. If the digital photograph is mostly text, a camera device may automatically adjust camera settings (e.g., resolution) related to the digital photograph to save storage space. In some embodiments, the camera device may prompt the user and ask if the text digital photograph should have its size or resolution reduced.

FIG. 1 depicts a camera device 100 for automatically adjusting camera settings responsive to photographic subject matter, according to embodiments of the disclosure. The camera device 100 includes a processor 102, an image sensor 104, an automatic adjustment module 106, an input/output device 108, a memory 110, and a storage device 112. The components of the camera device 100 may be communicatively coupled to each other, for example via a computer bus.

The processor 102 may comprise any known controller capable of executing computer-readable instructions and/or capable of performing logical operations on the input text. For example, the processor 102 may be a microcontroller, a microprocessor, a central processing unit (CPU), a graphics processing unit (GPU), an auxiliary processing unit, a FPGA, or similar programmable controller. The processor 102 reads (i.e., loads into registers) and executes instructions (i.e., program code) stored in the memory 110 to perform the methods and routines described herein. In some embodiments, the processor 102 includes a processor cache that loads instructions and/or data from the memory 110 for execution by the processor 102.

The image sensor 104, in one embodiment, is configured to convert an optical image of photographic subject matter into image data. As used herein optical image refers to the image formed by visible light reflecting off photographic subject matter, such as a person, an object, a setting, a scene, or the like. The reflected light comprising the optical image passes into the camera device 100 and illuminates the image sensor 104. The image sensor 104 comprises electronic circuitry that converts the reflected light into an electronic signal corresponding to the frequencies and intensities of the reflected light. In some embodiments, the image sensor 104 is a digital image sensor, for example, a charge-coupled device (CCD), complementary metal-oxide-semiconductor (CMOS), or an N-type metal-oxide-semiconductor (NMOS) image sensor. In some embodiments, the image sensor 104 converts the optical image into color space data, for example RGB color space data.

In certain embodiments, the image sensor 104 includes one or more optical sensors capable of converting an optical image into an electronic signal, the image data being based on the one or more electronic signals. In some embodiments, the image sensor 104 comprises an array of optical sensors, each optical sensor corresponding to a pixel or sub-pixel of the image data. The image data may include color and brightness data for a plurality of pixels. The image data may have a resolution based on the number of pixels.

The image data produced by the image sensor 104 has a plurality of properties, including a size, a resolution, and a color depth. The size of the image data may be based on the resolution of the image data, the color depth of the image data, and the format of the image data. The resolution of the image data may be based on the number of pixels included in the image data. The color depth may be based on a number of bits used to describe color properties (such as hue, brightness, and the like) associated with each pixel. In some embodiments, the color depth is further based on a number of bits used per color component (e.g., red, green, or blue).

The automatic adjustment module 106, in one embodiment, is configured to automatically adjust one or more settings related to the image data based on an identified nature of photographic subject matter associated with the image data. The camera device 100 and/or the image sensor 104 may have several settings related to the image data produced by the image sensor 104, including image resolution, data format, color depth, and the like. In some embodiments, these settings are configurable by the automatic adjustment module 106.

In some embodiments, the automatic adjustment module 106 modifies settings of the camera device 100 and/or the image sensor 104 before taking a digital photograph of the photographic subject matter. For example, the automatic adjustment module 106 may adjust a camera resolution, a camera color mode, a camera output file type, and/or another camera setting prior to taking the digital photograph. In other embodiments, the automatic adjustment module 106 modifies image data of a digital photograph after capture by the image sensor 104 but prior to storing the digital photograph in a non-volatile storage medium, such as the storage device 112. For example, the automatic adjustment module 106 may operate on image data in the memory 110 before it gets transferred to the storage device 112.

In some embodiments, the automatic adjustment module 106 reduces the size of the image data in response to determining that high-fidelity image data is not needed for the photographic subject matter. In certain embodiments, the automatic adjustment module 106 may reduce the image data size by reducing a resolution, color depth, and/or format associated with the image data. For example, the automatic adjustment module 106 may reduce the resolution and/or color depth of the image data for digital photographs of text documents. As another example, the automatic adjustment module 106 may reduce the image data size of for digital photographs of text documents by compressing the image data or by changing the image data format.

In some embodiments, the automatic adjustment module 106 is always active (e.g., analyzing image data and adjusting settings) when the camera device 100 is powered on. In other embodiments, the automatic adjustment module 106 is activated in response to a user placing the camera device 100 in a particular mode, such as an automatic mode or a storage saving mode. When activated, the automatic adjustment module 106 may analyze the photographic subject matter periodically or in response to a specific camera action. As used herein, a camera action refers to an action or routine performed by a digital camera as a part of taking a digital photograph. Camera actions may be manually initiated or automatically initiated. Examples of camera actions include, but are not limited to, an auto-focus routine, a shutter press, a light balancing routine, a color correction routine, a zoom action, a mode selection, an auto-flash routine, or the like.

The automatic adjustment module 106, in one embodiment, includes one or more modules that receive sensor input of photographic subject matter from the image sensor 104, identify a nature of the photographic subject matter, and alter a setting or parameter of the camera device 100 and/or image sensor 104 in response to determining the nature of the photographic subject matter. In some embodiments, the modules comprise hardware circuit or programmable logic devices. In other embodiments, the modules comprise software code for execution by a processor. In yet other embodiments, the modules may comprises a combination of hardware, software, and/or firmware.

The input/output device 108, in one embodiment, is operatively coupled to the processor 102 and may comprise any known input and/or output device. The input/output device 108 may include one or more input devices, such as a touch panel, a button, a key, or the like. In some embodiments, the automatic adjustment module 106 may be controlled via the input/output device 108.

The input/output device 108 may also include one or more display devices capable of outputting visual data to a user. In some embodiments, a display portion of the input/output device 108 includes a plurality of pixels arranged in a matrix and capable of displaying a particular combination of red, green, or blue (RGB) values corresponding to a portion of the image data received from the image sensor 104. For example, a display portion of the input/output device 108 may include a liquid crystal display (LCD) panel, a light-emitting diode (LED) display panel, an organic light-emitting diode (OLED) display panel, or the like. In some embodiments, an input portion of the input/output device 108 may be integrated with a display portion of the input/output device 108. For example, the input/output device 108 may include, a touchscreen or similar touch-sensitive display.

The memory 110, in one embodiment, is the primary (main) memory of the camera device 100. The memory 110 is directly accessible by the processor 102 and may include one or more memory modules. Each memory module in the memory 110 includes an array of memory cells, each storing a data value. In some embodiments, the memory 110 is subdivided into a plurality of logical memory blocks.

In certain embodiments, the memory 110 comprises a volatile computer readable storage medium. For example, the memory 110 may be a random access memory (RAM), including dynamic RAM (DRAM), synchronous dynamic RAM (SDRAM), and/or static RAM (SRAM), or another suitable memory device. In some embodiments, the memory 110 contains an operating system as well as program code and/or data for one or more processes actively running on the camera device 100. The operating system provides an interface between processes and the hardware of the camera device 100, such as the image sensor 104, input/output device 108, and storage device 112. In other embodiments, processes running on the camera device 100 have direct access to hardware resources of the camera device 100, including the image sensor 104, input/output device 108, and storage device 112.

The storage device 112, in one embodiment, is a non-volatile (e.g., persistent) computer readable storage medium. The storage device 112 is a re-writable storage medium and typically stores digital photographs (e.g., image data) received via the image sensor 104. The digital photographs may be stored in the storage device 112 using one of a variety of image file types. Examples of image file types include JPEG, JFIF, RAW, TIFF, and EXIF. Different file types may be selected according to file size requirements, image quality requirements, image properties, or the like. In some embodiments, a plurality of digital photographs are stored in the storage device 112 using two or more file types.

In some embodiments, the storage device 112 is a removable storage medium. Examples of removable storage medium useful in camera devices include flash memory cards, such as CompactFlash (CF) cards, Secure Digital (SD) card, xD-Picture cards, Memory Stick cards, Multi-Media cards (MMC), XDQ cards, and the like. In other embodiments, the storage device 112 may be non-removable storage medium, such as a hard disk drive, a solid-state (e.g., flash memory) drive, and/or another suitable computer storage device.

Figure 2:
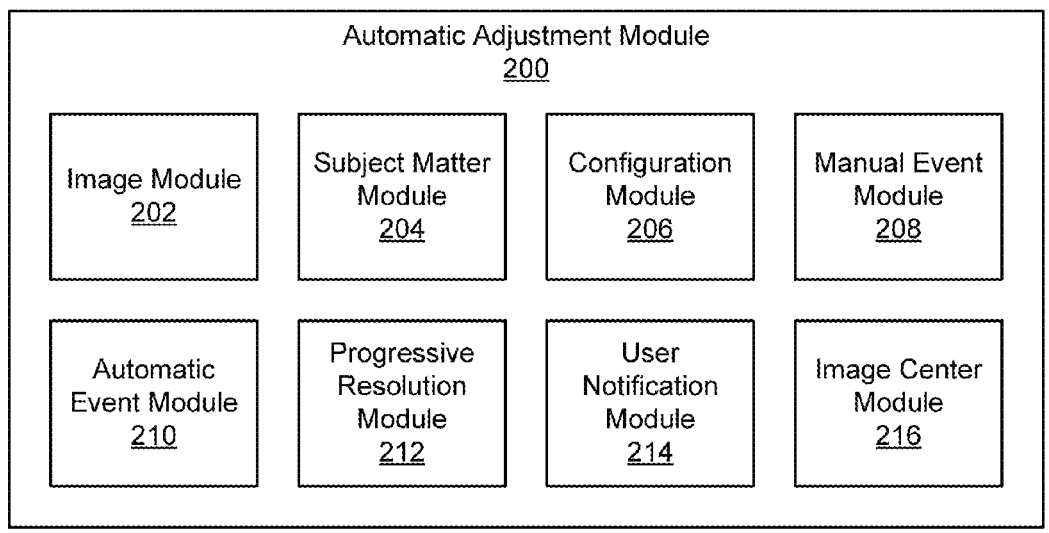
FIG. 2 is a schematic block diagram illustrating one embodiment of an apparatus for automatically adjusting camera settings responsive to photographic subject matter.

FIG. 2 depicts an apparatus 200 for automatically adjusting camera settings responsive to photographic subject matter, according to embodiments of the disclosure. In some embodiments, the automatic adjustment module 200 may be similar to, and perform the same functions as, the automatic adjustment module 106 described above with reference to FIG. 1. In general, as described above, the automatic adjustment module 200 receives sensor input of photographic subject matter, determines a nature of the photographic subject matter, and alters an image property and/or a camera setting, in response to determining the nature of the photographic subject matter. The automatic adjustment module 200 may include an image module 202, a subject matter module 204, and a configuration module 206. In certain embodiments, the automatic adjustment module 200 further includes one or more of a manual event module 208, an automatic event module 210, a progressive resolution module 212, a user notification module 214, and/or an image center module 216. The modules and components of the automatic adjustment module 200 are operatively coupled to one another and may pass data and/or notifications to one another.

The image module 202, in one embodiment, receives sensor input of photographic subject matter. In some embodiments, the sensor input includes image data received from an image sensor, such as the image sensor 104 described above with reference to FIG. 1. In some embodiments, the sensor input includes image data retrieved from a buffer or volatile memory device. In some embodiments, the sensor input includes image data provided to a camera display, such as a display portion of the input/output device 108.

In certain embodiments, the image module 202 periodically samples image data captured by the image sensor 104. For example, the image module 202 may obtain image data from the image sensor 104 every second. In other embodiments, the image module 202 obtains image data from the image sensor 104 in response to a trigger event. The trigger event may be a camera action such as a shutter press, an auto-focus routine, a light balancing routine, a color correction routine, or the like.

The subject matter module 204, in one embodiment, identifies a nature of the photographic subject matter. The subject matter module 204 receives sensor input from the image module 202, including image data in one embodiment. The subject matter module 204 analyzes the sensor input (e.g., image data) to determine the photographic subject matter and to identify a nature of the photographic subject matter. In some embodiments, the subject matter module 204 determines whether the photographic subject matter corresponds to a particular category. For example, the subject matter module 204 may receive image data from the image module 202 and determine whether the photographic subject matter of the image data corresponds to a portrait (e.g., a photograph of a person), a setting or scene (e.g., a photograph of a landscape), or a document (e.g., a letter or receipt). Where the photographic subject matter is determined to be a document, a lower-fidelity digital photograph may capture the information in the document, thus saving space in the storage device 112 for other digital photographs.

In some embodiments, the subject matter module 204 identifies the nature of the photographic subject matter based, at least in part, on the presence (or absence) of words and/or faces. In certain embodiments, the subject matter module 204 may analyze image data for the presence of words, for example using an optical character recognition algorithm. In certain embodiments, the subject matter module 204 may analyze image data to determine the presence of faces, for example using a facial recognition algorithm.

As few documents include faces, the subject matter module 204 may determine that the nature of photographic subject matter comprising a face is less likely to be a document. Additionally, the subject matter module 204 may determine that the nature of photographic subject matter comprising words is more likely to be a document than a portrait or setting. As some scenes or settings include words and as some documents include faces, the presence (or absence) of words or faces may not be definitive and may be combined with additional information regarding the photographic subject matter to determine the nature of the photographic subject matter. For example, the subject matter module 204 may include the presence (or absence) of words or faces among a number of factors used to calculate the likelihood that the photographic subject matter is a document, a portrait, a setting or scene, or another category of photographic subject matter.

In some embodiments, the subject matter module 204 identifies the nature of the photographic subject matter based, at least in part, on color distribution and/or light levels. Many documents comprise black text on a light background (e.g., a white or off-white background) and tend towards monochrome, while many portraits, scenes, and settings are varicolored. Accordingly, the subject matter module 204 may determine that the nature of photographic subject matter comprising a monochrome or near monochrome color distribution is more likely to be a document. Additionally, digital photographs of documents are rarely taken outdoors, so photographic subject matter with a light level or amount of light reaching the image sensor 104 exceeding a lighting threshold may be more likely to be a portrait, a setting, or scene, than a document. Accordingly, the subject matter module 204 may include the color distribution and/or light levels of the photographic subject matter among a number of factors used to calculate the likelihood that the photographic subject matter is a document, a portrait, a setting or scene, or another category of photographic subject matter.

In some embodiments, the subject matter module 204 analyzes a plurality of factors indicative of the nature of the photographic subject matter. In certain embodiments, the subject matter module 204 assigns values to each factor based on an analysis of that factor. The assigned values may reflect the likelihood that photographic subject matter has a particular nature based on the factor and the relative importance of the factor in identifying the nature of the photographic subject matter. The subject matter module 204 may then combine (e.g., sum) the values and identify the nature of the photographic subject matter based on the combined values. For example, the subject matter module 204 may determine that the nature of the photographic subject matter is a document when the combined values are within a first range, a portrait when the combined values are within a second range, and a scene or setting when the combined values are within a third range.

In certain embodiments, the subject matter module 204 may determine the likelihood that the photographic subject matter has a particular nature based on the analysis of the plurality of factors. The plurality of factors analyzed may include, but are not limited to, color distribution, light levels, presence of faces, presence of words, and the like. In some embodiments, the plurality of factors includes photographic subject matter orientation where a portrait orientation may be indicative of a document while a landscape orientation may be indicative of a scene or setting. Results of the analysis of the factors may be used to calculate (or adjust) a probability that the photographic subject matter has a particular nature. For example, the subject matter module 204 may input the results into one or more probability models used to determine the likelihood that the photographic subject matter has a particular nature among a plurality of evaluated natures. In some embodiments, the subject matter module 204 may identify the nature of the photographic subject matter based on a highest likelihood among the plurality of evaluated natures. In some embodiments, the subject matter module 204 may identify the nature of the photographic subject matter based on a likelihood associated with a particular nature exceeding a threshold.

In some embodiments, the subject matter module 204 gives greater weight to factors that are more indicative of the nature of the photographic subject matter. For example, the presence of faces may be more indicative of the nature of the photographic subject matter than the light levels associated with the photographic subject matter, thus the subject matter module 204 may give greater weight to the presence of faces when identifying the nature of the photographic subject matter. As another example, the color distribution of the photographic subject matter may be more indicative of the nature of the photographic subject matter than the presence of words, thus the subject matter module 204 may give greater weight to color distribution when identifying the nature of the photographic subject matter.

In some embodiments, the subject matter module 204 may prompt for and/or receive user feedback regarding the identified nature of the photographic subject matter. In certain embodiments, the subject matter module 204 may then adjust or modify one or more the user feedback into one or more probability models used to determine a likely nature of the photographic subject matter based on the user feedback. In certain embodiments, the subject matter module 204 may adjust a weight given to a particular factor based on the user feedback. Thus, the subject matter module 204 may incorporate a learning algorithm the uses the user feedback used to improve the identification of the nature of the photographic subject matter.

The configuration module 206, in one embodiment, alters a camera setting based on the identified nature of the photographic subject matter. The configuration module 206 may receive an identification of the nature of the photographic subject matter, e.g., from the subject matter module 204. In some embodiments, the configuration module 206 adjusts settings of a digital camera (e.g., the camera device 100) and/or an image sensor (e.g., the image sensor 104). For example, the configuration module 206 may modify settings relating to how the image sensor 104 captures image data. As another example, the configuration module 206 may modify settings relating to how the camera device 100 stores image data captured by the image sensor 104. The settings adjustable by the configuration module 206 may include, but are not limited to, image resolution, image color depth and/or color mode, image data format, image data size, digital photograph file type, digital photograph file size, and the like.

In some embodiments, the configuration module 206 modifies the camera settings prior to taking a digital photograph of the photographic subject matter. For example, the configuration module 206 may dynamically adjust a camera resolution, a camera color mode, a camera output file type, and/or another camera setting based on the identified nature of the photographic subject matter. In other embodiments, the configuration module 206 modifies camera settings for captured image data prior to storing a digital photograph in a non-volatile storage medium, such as the storage device 112. For example, the configuration module 206 may adjust camera settings related to converting captured image data stored in volatile memory (e.g., in the memory 110) into a digital photograph stored in non-volatile memory (e.g., in the storage device 112).

In some embodiments, the configuration module 206 alters camera settings to effect a reduction in the size of the image data. The configuration module 206 may reduce image data size in response to determining that nature of the photographic subject matter does not require high-fidelity image data. For example, the configuration module 206 may reduce image data size for photographic subject matter identified as a text document. In certain embodiments, the configuration module 206 may reduce the image data size by reducing a resolution, color depth, and/or format associated with the image data. For example, the configuration module 206 may reduce the resolution and/or color depth for a text document. As another example, the configuration module 206 may compress image data or change a file format for a text document.

In some embodiments, the configuration module 206 alters camera settings by importing a predetermined collection of settings based on the identified nature of the photographic subject matter. In certain embodiments, a collection of settings for each evaluated nature is stored in memory, such as the memory 110 and/or the storage device 112. The configuration module 206 may retrieve a collection of settings from memory according to the identified nature and modify settings of the camera device 100 and/or the image sensor 104 to match the retrieved settings. Each collection of settings may include optimized settings for resolution, color depth, format, and the like for each corresponding photographic subject matter nature.

In some embodiments, the configuration module 206 only alters a camera setting in response to receiving permission from a user. In certain embodiments, the user may be prompted to permit alteration of camera settings. For example, the camera device 100 may prompt the user to allow automatic alteration of camera settings based on photographic subject matter each time the camera device 100 is powered on. In other embodiments, the user may indicate permission by manually setting the camera device 100 to a particular mode.

The shutter (manual event) module 208, in one embodiment, is configured to detect a manual camera action. As used herein, a manual camera action refers to a manually-initiated camera action such as a shutter input, a zoom action, a mode selection, and the like. In some embodiments, the subject matter module 204 and/or configuration module 206 await a triggering event to analyze the photographic subject matter and adjust settings according to the nature of the photographic subject matter. Thus the manual event module 208 may be configured to alert or trigger the subject matter module 204 and/or the configuration module 206 in response to detecting a manual camera action, wherein the subject matter module 204 and/or configuration module 206 perform in response to receiving the alert or trigger from the manual event module 208.

In some embodiments, the manual event module 208 detects a shutter input and causes the subject matter module 204 to identify the nature of photographic subject matter in response to detecting the shutter input. In some embodiments, manual event module 208 identifies a mode selection and causes the subject matter module 204 to identify the nature of the photographic subject matter and/or causes the configuration module 206 to alter camera settings based on the selected mode. For example, the manual event module 208 may cause the subject matter module 204 to identify the nature of photographic subject matter in response to manual selection of a document mode or a storage optimizing mode.

The auto-focus (automatic event) module 210, in one embodiment, configured to detect an automatic camera action. As used herein, an automatic camera action refers to an automatically-initiated camera action such as an auto-focus routine, a light balancing routine, a color correction routine, an auto-flash routine, and the like. In some embodiments, the subject matter module 204 and/or configuration module 206 await a triggering event to analyze the photographic subject matter and adjust settings according to the nature of the photographic subject matter. Thus the automatic event module 210 may be configured to alert or trigger the subject matter module 204 and/or the configuration module 206 in response to detecting an automatic camera action, wherein the subject matter module 204 and/or configuration module 206 perform in response to receiving the alert or trigger from the automatic event module 210. For example, the automatic event module 210 may detect an auto-focus routine and cause the subject matter module 204 to identify the nature of photographic subject matter in response to detecting the auto-focus routine.

The progressive resolution module 212, in one embodiment, is configured to reduce the resolution of image data in a progressive or incremental manner. In some embodiments, the progressive resolution module 212 reduces a resolution by an initial amount and determines whether text in the sensor input is computer readable. In certain embodiments, the progressive resolution module 212 analyzes the reduced-resolution image data using an optical character recognition algorithm to determine whether text is computer readable. In response to the text being computer readable, the progressive resolution module 212 may reduce the resolution by an additional amount and determine whether the text is still computer readable. In some embodiments, the progressive resolution module 212 increases the resolution in response to the text not being computer readable. In other embodiments, the progressive resolution module 212 maintains the current resolution in response to the text not being computer readable.

In some embodiments, the initial amount by which the resolution is reduced may be the same as the additional amount. Thus, the progressive resolution module 212 may gradually reduce the resolution of the image data. In other embodiments, the initial amount is significantly larger than the additional amount. For example, the progressive resolution module 212 may initially reduce the resolution by 50% and reduce the resolution by 5% or 10% in subsequent reductions.

In some embodiments, the progressive resolution module 212 may progressively reduce resolution to the limits of computer readability. For example, the progressive resolution module 212 may reduce resolution until the text is just readable (or just unreadable) by an optical character recognition algorithm. In other embodiments, the progressive resolution module 212 may progressively reduce resolution to a predefined quality level. The predefined quality level may be set by the digital camera provider or may be user-defined. In yet other embodiments, the may progressively reduce resolution until a predefined file size is reached. The predefined file size may be set by the digital camera provider or may be user-defined.

The user notification module 214, in one embodiment, prompts a user to allow automatic alteration of camera settings based on photographic subject matter. In some embodiments, the user notification module 214 informs the user of a projected amount of space saved by allowing automatic alteration of camera settings. In certain embodiments, the user notification module 214 receives permission from the user allowing automatic alteration of camera settings, wherein the configuration module 206 only alters the camera setting in response to the user permitting alteration camera settings.

In some embodiments, the user notification module 214 prompts the user to allow automatic alteration of camera settings based on photographic subject matter each time the camera device 100 is powered on. In some embodiments, the user notification module 214 prompts the user to allow automatic alteration of camera settings based on photographic subject matter when an automatic camera mode is selected. In certain embodiments, the user notification module 214 does not prompt the user to allow automatic alteration of camera settings when the user selects a particular mode. For example, if the user selects a document mode or a storage optimizing mode, the user notification module 214 may refrain from prompting as the mode selection implies permission to automatically alteration of camera settings based on photographic subject matter.

The image center module 216, in one embodiment, identifies a central region of the sensor input. As objects of interest (e.g., subjects of a photograph) are often located in the central region of a photograph, analysis of the central region may improve the speed and/or accuracy of identifying the nature of the photographic subject matter. For example, if analysis reveals that the central region is predominantly text, there is a strong likelihood that the photographic subject matter is a text document.

In some embodiments, the image center module 216 indicates the central region to the subject matter module 204 which then identifies the nature of the photographic subject matter based on analysis of the central region, thereby improving the speed of the subject matter module 204. In some embodiments, the image center module 216 indicates the central region to the subject matter module 204 which then gives greater weight to the analysis of the central region (e.g., factors indicative of subject matter found within the central region), thereby improving the accuracy of the subject matter module 204. For example, the subject matter module 204 may perform, on the central region of the sensor input, one or more analyses selected from the group consisting of: optical character recognition, facial recognition, color distribution analysis, and light level analysis.

In some embodiments, the image center module 216 identifies the central region using a mask or bitmap defining the central region. In other embodiments, the central region is dynamically calculated by the image center module 216 based on stored parameters, such as predefined boundaries. In certain embodiments, the central region is defined in relation to a center pixel or coordinate within image data captured by the image sensor 104. In certain embodiments, the central region is defined in relation to a physical area on the image sensor 104. The central region may be preset (e.g., defines by a digital camera provider) or may be user defined.

In some embodiments, the shape of the central region may be selected to optimize analysis speed. In some embodiments, the shape of the central region may be selected to optimize analysis accuracy. Examples of central region shapes include, but are not limited to, a circular region, an oval region, a diamond region, a rectangular region, or the like. While depicted in FIG. 2 as an independent module, in certain embodiments the progressive resolution module 212 is a component of the image module 202.

Figure 3:
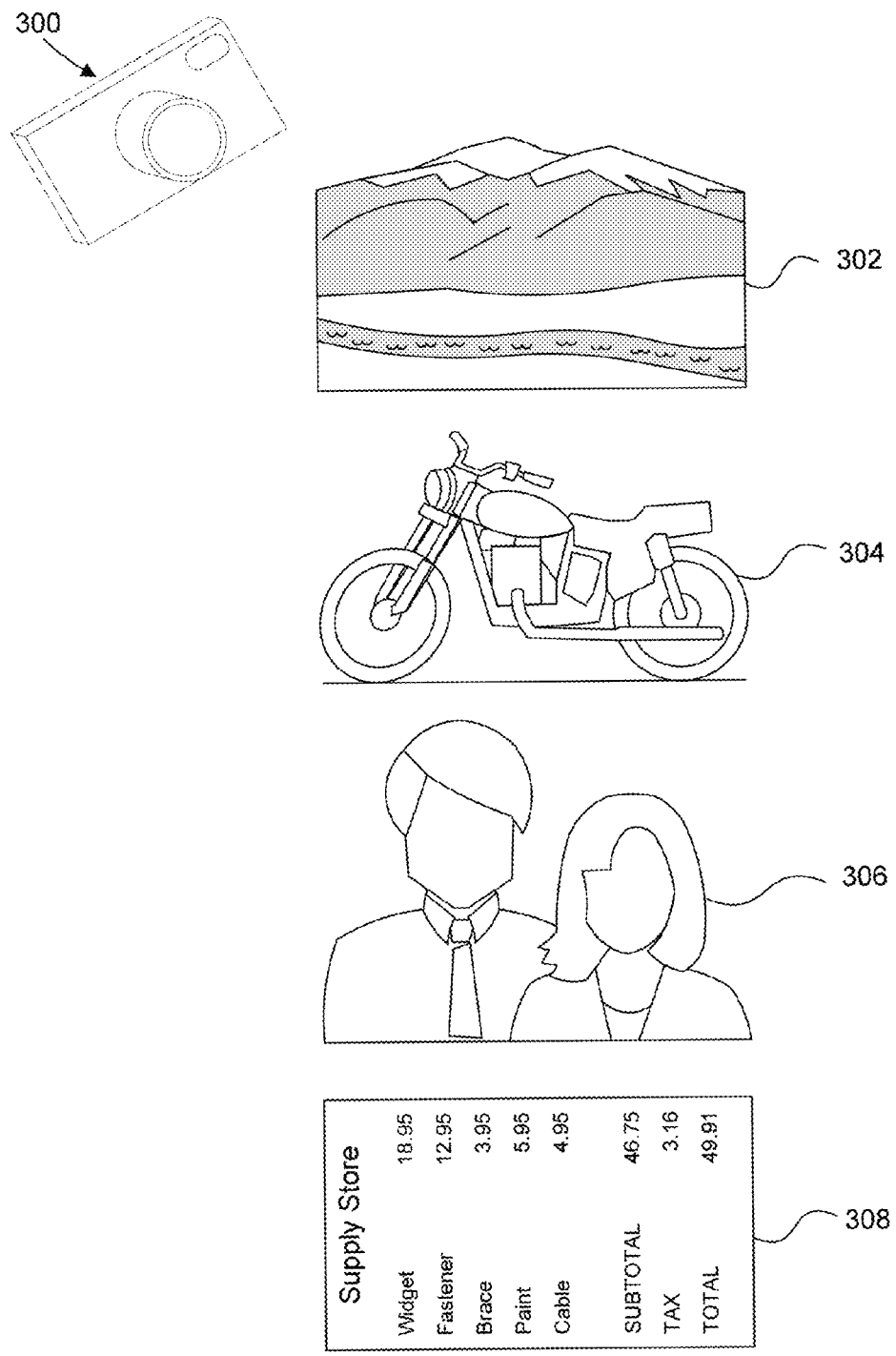
FIG. 3 is a diagram illustrating one example of a camera device with automatic adjustment for text documents.

FIG. 3 depicts a camera device 300 with automatic adjustment for text documents, according to embodiments of the disclosure. The camera device 300 is used to take digital photographs of photographic subject matters 302-308, to analyze the photographic subject matter to identify a nature or category to which photographic subject matters 302-308 belong, and to automatically adjust settings of the camera device 300 in response to determining that a photographic subject matter is a text document.

The first photographic subject matter 302 is a mountain scene. The camera device 300, in some embodiments, analyzes a plurality of factors to identify a nature or category of the first photographic subject matter 302. In one embodiment, the camera device 300 analyzes light levels and color distributions. Here, the first photographic subject matter 302 has high light levels indicative of an outdoors setting and polychromatic color distributions. Accordingly, the camera device 300 may determine that the nature of the first photographic subject matter 302 is that of a scene or setting and not that of a text document.

The second photographic subject matter 304 is a motorcycle. The camera device 300, in some embodiments, analyzes a plurality of factors to identify a nature or category of the second photographic subject matter 304. In one embodiment, the camera device 300 analyzes color distributions and the presence of words or faces. Here the second photographic subject matter 304 has polychromatic color distribution and there are not faces present. While the second photographic subject matter 304 may include some words, the camera device 300 may determine that amount of words present is relatively small (i.e., below a predetermined threshold) and thus irrelevant for classification purposes. Accordingly, the camera device 300 may determine that the nature of the second photographic subject matter 304 is that of a portrait or scene, and not that of a text document.

The third photographic subject matter 306 is a couple. The camera device 300, in some embodiments, analyzes a plurality of factors to identify a nature or category of the third photographic subject matter 306. In one embodiment, the camera device 300 analyzes color distributions and the presence of faces. Here the third photographic subject matter 306 has polychromatic color distribution and there are faces present. Accordingly, the camera device 300 may determine that the nature of the third photographic subject matter 306 is that of a portrait, and not that of a text document.

The fourth photographic subject matter 308 is a receipt. The camera device 300, in some embodiments, analyzes a plurality of factors to identify a nature or category of the fourth photographic subject matter 308. In one embodiment, the camera device 300 analyzes light levels, color distributions, and the presence of words or faces. Here the fourth photographic subject matter 308 has light levels indicative of an indoors setting and predominantly monochromatic color distribution. Further, there are many words present and no faces present. Accordingly, the camera device 300 may evaluate the plurality of factors and determine that of a text document.

In some embodiments, the camera device 300 automatically adjusts camera settings in response to determining that the fourth photographic subject matter 308 is a text document. In some embodiments, the camera device 300 alters camera settings to effect a reduction in the size of the image data for a digital photograph of the fourth photographic subject matter 308. In certain embodiments, the configuration module 206 may reduce the image data size by reducing a resolution, color depth, and/or format associated with the image data.

In some embodiments, the camera device 300 automatically adjusts the camera settings prior to capturing digital photograph image data of the fourth photographic subject matter 308. In other embodiments, the camera device 300 automatically adjusts the camera settings after capturing the image data, but prior to storing a digital photograph in a non-volatile storage medium. The automatically adjusted settings may include, but are not limited to, image resolution, image color depth and/or color mode, image data format, image data size, digital photograph file type, digital photograph file size, and the like.

Figure 4:
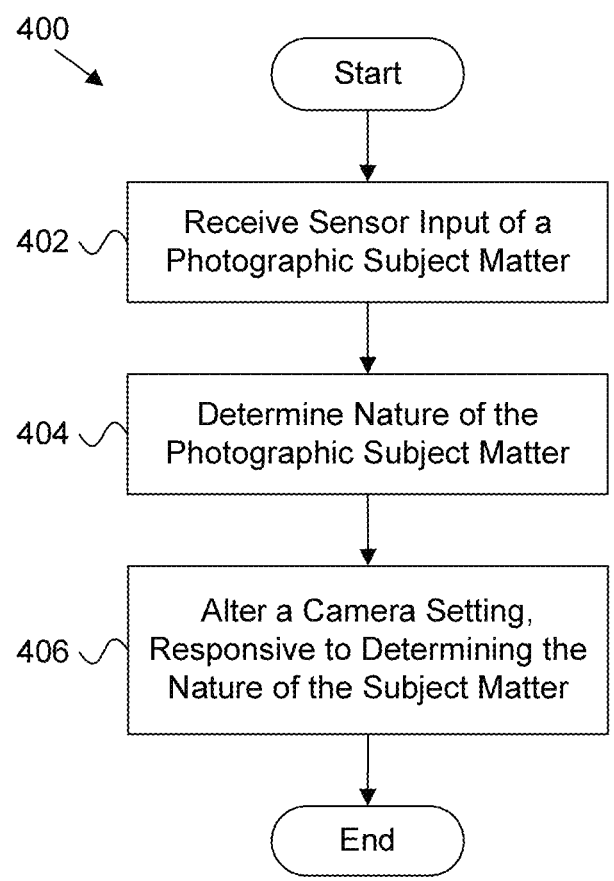
FIG. 4 is a schematic flow chart diagram illustrating one embodiment of a method for automatically adjusting camera settings responsive to photographic subject matter.

FIG. 4 depicts a method 400 for automatically adjusting camera settings responsive to photographic subject matter, according to embodiments of the disclosure. In some embodiments, the method 400 is performed using a automatically adjusting camera device, such as the automatic adjustment module 106, the automatic adjustment module 200, and/or the camera device 300 described above with reference to FIGS. 1-3. In some embodiments, the method 400 is performed by a processor, such as a microcontroller, a microprocessor, a central processing unit (CPU), a graphics processing unit (GPU), an auxiliary processing unit, a FPGA, or the like.

The method 400 begins and the automatically adjusting camera device receives 402 sensor input of photographic subject matter. In certain embodiments, the sensor input includes image data associated with a digital photograph. In some embodiments, the sensor input includes image data received 402 from an image sensor, such as the image sensor 104. In some embodiments, the sensor input includes image data received 402 from a buffer or volatile memory device.

In some embodiments, receiving 402 the sensor input may include receiving image data at regular intervals. For example, image data may every one or two seconds. In some embodiments, receiving 402 the sensor input include receiving image data in response to a triggering event, such as a shutter press, an auto-focus routine, a light balancing routine, a color correction routine, and the like.

In certain embodiments, receiving 402 the sensor input includes identifying a central region of the sensor input. In some embodiments, the central region of the sensor input may be identified using a mask or bitmap that defines a center area. In other embodiments, the central region may be dynamically calculated using predefined boundaries. For example, the central region may be identified based on to a center pixel or coordinate within received image data.

The automatically adjusting camera device then determines 404 a nature of the photographic subject matter. In some embodiments, determining 404 the nature of photographic subject matter includes performing one or more of a character recognition analysis, a facial recognition analysis, a color distribution analysis, and a light level analysis. In certain embodiments, determining 404 the nature of the photographic subject matter includes identifying a category to which the photographic subject matter belongs. For example, the photographic subject matter may be categorized as a portrait (e.g., a photograph of a person), a setting or scene (e.g., a photograph of a landscape), or a document (e.g., a letter or receipt). In some embodiments, determining 404 the nature of photographic subject matter includes determining whether or not the photographic subject matter is a document.

In some embodiments, determining 404 the nature of the photographic subject matter is based on analyses of a plurality of factors indicative of the nature of the photographic subject matter. Values may be assigned to each factor based on an analysis of that factor, the assigned values reflecting the likelihood that photographic subject matter has a particular nature. The plurality of factors analyzed may include, but are not limited to, color distribution, light levels, presence of faces, presence of words, and the like. In some embodiments, the plurality of factors includes photographic subject matter orientation (e.g., a portrait orientation or a landscape orientation).

In certain embodiments, determining 404 the nature of photographic subject matter includes placing greater emphasis on those factors that are more indicative of the nature of the photographic subject matter. For example, the presence of faces may be more indicative of the nature of the photographic subject matter than the light levels associated with the photographic subject matter, thus greater emphasis may be placed on the presence of faces when determining 404 the nature of the photographic subject matter. As another example, the color distribution of the photographic subject matter may be more indicative of the nature of the photographic subject matter than the presence of words, thus greater emphasis may be placed on color distribution when determining 404 the nature of the photographic subject matter.

Next, the automatically adjusting camera device alters 406 one or more camera settings based on the nature of the photographic subject matter. For example, altering 406 the camera settings may include adjusting how the automatically adjusting camera device captures and/or stores image data. In some embodiments, the automatically adjusting camera device alters 406 a camera setting in response to the nature of the photographic subject matter being a text document. For example, where the photographic subject matter is determined to be a document, a lower-fidelity digital photograph may capture the information in the document, thus maximizing the number digital photographs storable by the automatically adjusting camera device. In certain embodiments, altering 406 a camera setting comprises altering one or more of an image resolution, image color depth and/or color mode, image data format, image data size, digital photograph file type, digital photograph file size, and the like.

In some embodiments, altering 406 the camera settings occurs prior to taking a digital photograph of the photographic subject matter. For example, camera settings may be dynamically adjusted based on periodic identifications of the nature of the photographic subject matter. In other embodiments, altering 406 the camera settings occurs after capturing image data, but prior to storing a digital photograph in a non-volatile storage medium, such as the storage device 112. For example, image resolution, color scheme, file format, and/or file size may be altered as a digital photograph is stored in the non-volatile memory.

In some embodiments, the altering 406 the camera settings includes reducing the size of the image data in response to determining that nature of the photographic subject matter does is a text document. In certain embodiments, altering 406 the camera settings may include reducing a resolution, color depth, and/or format associated with the image data.

In some embodiments, altering 406 the camera settings includes importing a predetermined collection of settings based on the identified nature of the photographic subject matter. In certain embodiments, a collection of settings for each evaluated nature is stored in memory. A collection of settings from memory is retrieved according to the identified nature and camera settings are altered 406 to match the retrieved settings. Each collection of settings may include optimized settings for resolution, color depth, format, and the like for each corresponding photographic subject matter nature.

Figure 5:
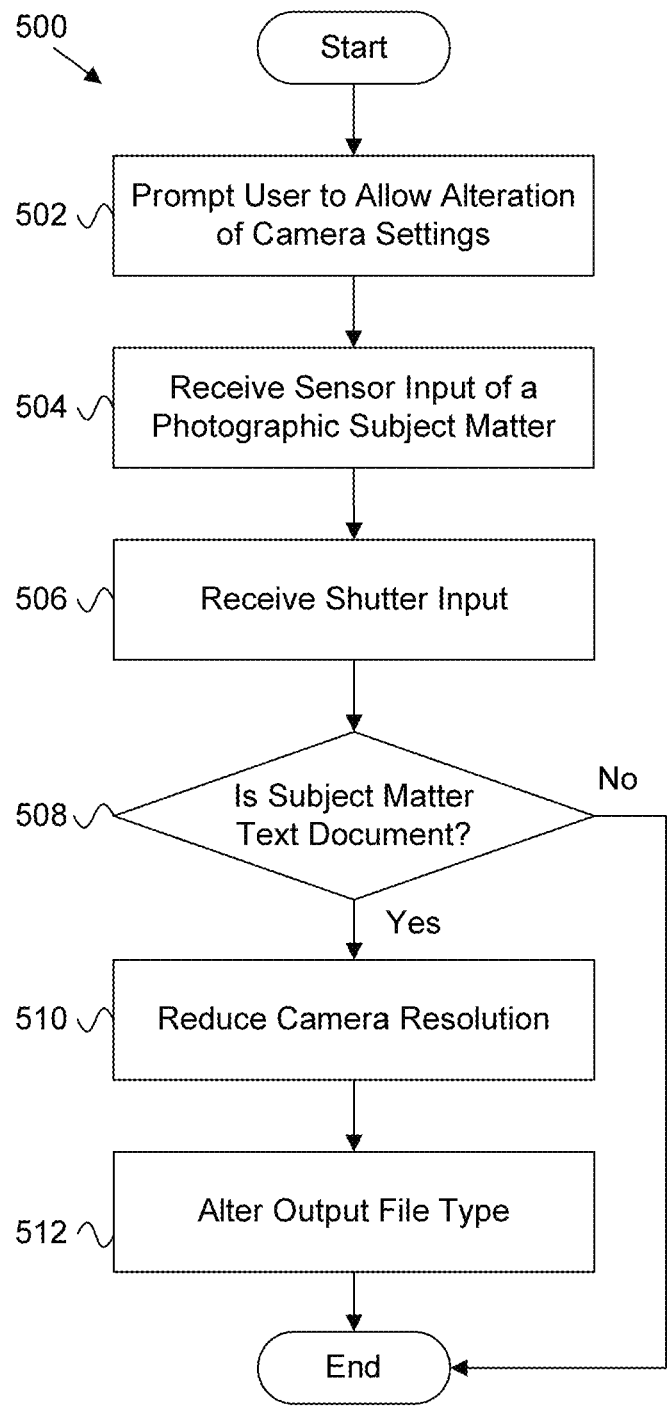
FIG. 5 is a schematic flow chart diagram illustrating one embodiment of a method for automatically adjusting camera settings responsive to photographic subject matter.

FIG. 5 depicts a method 500 for automatically adjusting camera settings responsive to photographic subject matter, according to embodiments of the disclosure. In some embodiments, the method 500 is performed using a automatically adjusting camera device, such as the automatic adjustment module 106, the automatic adjustment module 200, and/or the camera device 300 described above with reference to FIGS. 1-3. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins and the automatically adjusting camera device prompts 502 a user to allow automatic alteration of camera settings based on photographic subject matter. In some embodiments, prompting 502 the user includes informing the user of a projected amount of space saved by allowing automatic alteration of camera settings. For example, the user may be informed of a number of additional digital photographs that may be stored by allowing automatic alteration of camera settings. In some embodiments, prompting 502 the user to allow automatic alteration of camera settings occurs in response to the automatically adjusting camera device being powered on or entering an automatic camera mode.

The automatically adjusting camera device then receives 504 sensor input of photographic subject matter. In certain embodiments, the sensor input includes image data associated with a digital photograph. In some embodiments, the sensor input includes image data received 504 from an image sensor, such as the image sensor 104. In some embodiments, the sensor input includes image data received 504 from a buffer or volatile memory device.

In certain embodiments, receiving 504 the sensor input includes identifying a central region of the sensor input. In some embodiments, the central region of the sensor input may be identified using a mask or bitmap that defines a center area. In other embodiments, the central region may be dynamically calculated using predefined boundaries. For example, the central region may be identified based on to a center pixel or coordinate within received image data.

The automatically adjusting camera device then receives 506 a shutter input. In some embodiments, receiving 506 the shutter input includes monitoring user actions for a shutter actuation. The automatically adjusting camera device then determines 508 whether the photographic subject matter is a text document in response to receiving 506 the shutter input. In some embodiments, determining 508 whether the photographic subject matter is a text document includes performing one or more of a character recognition analysis, a facial recognition analysis, a color distribution analysis, and a light level analysis. In certain embodiments, determining 508 whether the photographic subject matter is a text document includes identifying a category to which the photographic subject matter belongs. For example, the photographic subject matter may be categorized as a portrait (e.g., a photograph of a person), a setting or scene (e.g., a photograph of a landscape), or a document (e.g., a letter or receipt).

In some embodiments, determining 508 whether the photographic subject matter is a text document includes analyzing a plurality of factors indicative of the nature of the photographic subject matter. Values may be assigned to each factor based on an analysis of that factor, the assigned values reflecting the likelihood that photographic subject matter has a particular nature. The plurality of factors analyzed may include, but are not limited to, color distribution, light levels, presence of faces, presence of words, and the like. In some embodiments, the plurality of factors includes photographic subject matter orientation (e.g., a portrait orientation or a landscape orientation).

In certain embodiments, determining 508 whether the photographic subject matter is a text document includes placing greater emphasis on those factors that are more indicative of the nature of the photographic subject matter. For example, the presence of faces may be more indicative of the nature of the photographic subject matter than the light levels associated with the photographic subject matter, thus greater emphasis may be placed on the presence of faces when determining 508 whether the photographic subject matter is a text document. As another example, the color distribution of the photographic subject matter may be more indicative of the nature of the photographic subject matter than the presence of words, thus greater emphasis may be placed on color distribution when determining 508 the nature of the photographic subject matter.

If the photographic subject matter is a text document, then the automatically adjusting camera device reduces 510 the camera resolution. For example, where the photographic subject matter is determined to be a text document, a lower-fidelity digital photograph may capture the information in the document, thus maximizing the number digital photographs storable by the automatically adjusting camera device. Otherwise, if the photographic subject matter is not a text document, then the automatically adjusting camera device does not alter camera settings and the method 500 ends.

Reducing 510 the camera resolution, in one embodiment, includes adjusting settings of an image sensor to reduce the number of pixels captured by the image sensor. In other embodiments, reducing the camera resolution includes adjusting storage settings of the automatically adjusting camera device to reduce resolution of captured image data to a predetermined lower resolution. Reducing 510 the camera resolution may further include compressing captured image data to a lower resolution. In some embodiments, the camera resolution is reduced 510 subsequent to the shutter press, but prior to capturing image data corresponding to the photographic subject matter. In other embodiments, the camera resolution is reduced 510 subsequent to capturing image data, but prior to storing a digital photograph in a non-volatile storage medium, such as the storage device 112.

Next, the automatically adjusting camera device alters 512 an output file type. In some embodiments, the output file type is selected that optimizes digital photography of text documents. In other embodiments, the output file type is selected to improve sharing the digitized text document. For example, a common digital text document format such as the portable document format (PDF) may be selected. As another example, a file format that works well with internet browser may be selected.

In certain embodiments, altering 512 the output file type includes selecting a file type that minimizes the output file size. For example, an output file format that supports a lesser color depth may be selected to minimize the output file size. In some embodiments, altering 512 the output file type includes compressing the image data to a smaller file size. In further embodiments, altering 512 the output file type includes selecting a compression algorithm that minimizes file size. The method 500 ends.

Figure 6:
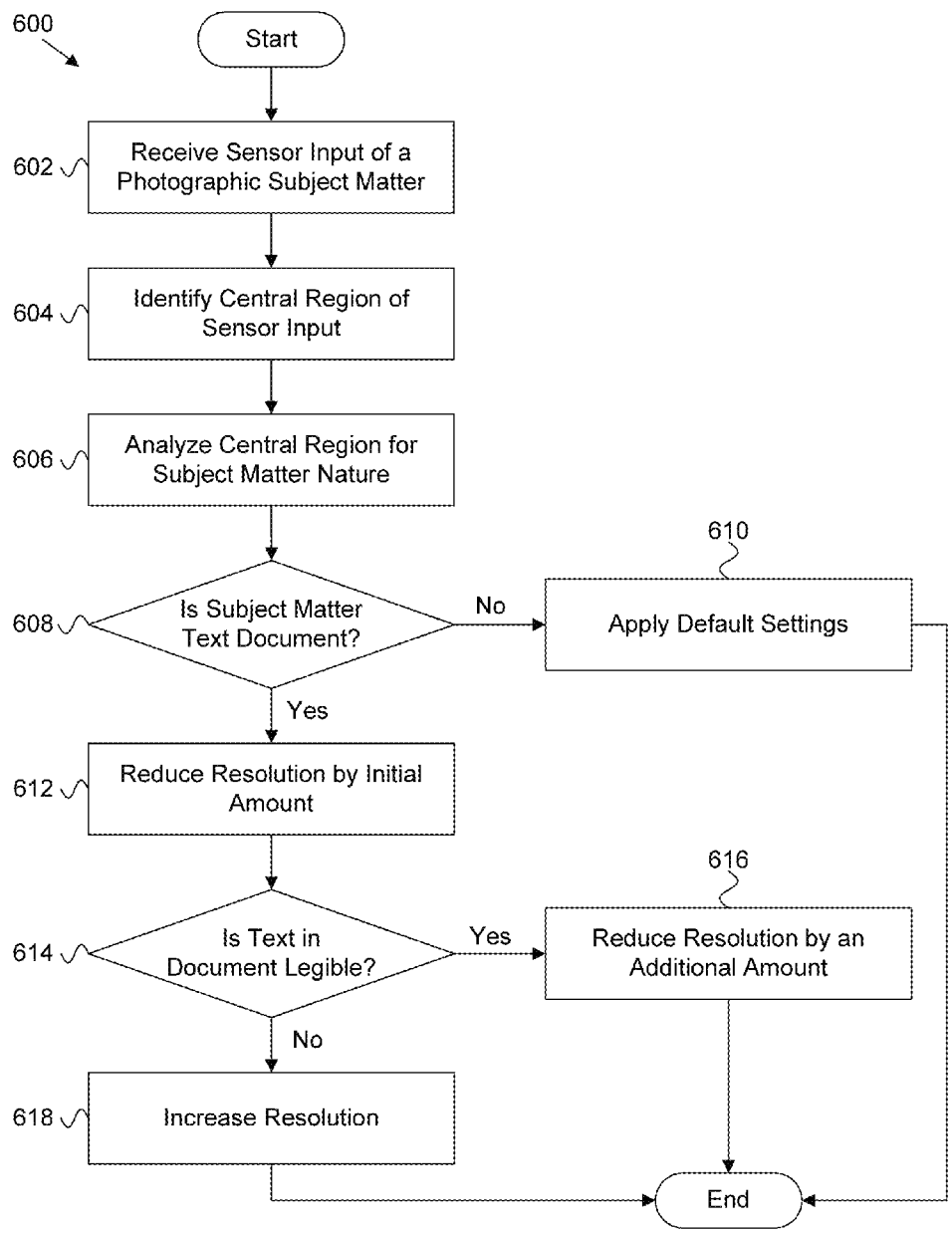
FIG. 6 is a schematic flow chart diagram illustrating another embodiment of a method for automatically adjusting camera settings responsive to photographic subject matter.

FIG. 6 depicts a method 600 for automatically adjusting camera settings responsive to photographic subject matter, according to embodiments of the disclosure. In some embodiments, the method 600 is performed using a automatically adjusting camera device, such as the automatic adjustment module 106, the automatic adjustment module 200, and/or the camera device 300 described above with reference to FIGS. 1-3. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins with the automatically adjusting camera device receiving 602 sensor input of a photographic subject matter. In certain embodiments, the sensor input includes image data associated with a digital photograph. In some embodiments, the sensor input includes image data received 602 from an image sensor, such as the image sensor 104. In some embodiments, the sensor input includes image data received 602 from a buffer or volatile memory device.

In some embodiments, receiving 602 the sensor input may include receiving image data at regular intervals. For example, image data may every one or two seconds. In some embodiments, receiving 602 the sensor input include receiving image data in response to a triggering event, such as a shutter press, an auto-focus routine, a light balancing routine, a color correction routine, and the like.

The automatically adjusting camera device then identifies 604 a central region of the sensor input. In some embodiments, identifying 604 the central region includes using a mask or bitmap defining the central region. In other embodiments, identifying 604 the central region includes dynamically calculating the central area based on stored parameters, such as predefined boundaries. In certain embodiments, the central region is defined in relation to a center pixel or coordinate within image data captured by the image sensor 104. In certain embodiments, the central region is defined in relation to a physical area on the image sensor 104. The central region may be preset (e.g., defines by a digital camera provider) or may be user defined.

Next, the automatically adjusting camera device analyzes 606 the central region of the sensor input to determine the nature of the photographic subject matter. In some embodiments, analyzing 606 the central region to determine the photographic subject matter nature includes performing one or more of a character recognition analysis, a facial recognition analysis, a color distribution analysis, and a light level analysis. In certain embodiments, analyzing 606 the central region includes identifying a category to which the photographic subject matter belongs. For example, the photographic subject matter may be categorized as a portrait (e.g., a photograph of a person), a setting or scene (e.g., a photograph of a landscape), or a document (e.g., a letter or receipt).

In some embodiments, analyzing 606 the central region includes analyzing a plurality of factors indicative of the nature of the photographic subject matter. Values may be assigned to each factor based on an analysis of that factor, the assigned values reflecting the likelihood that photographic subject matter has a particular nature. The plurality of factors analyzed may include, but are not limited to, color distribution, light levels, presence of faces, presence of words, and the like. In some embodiments, the plurality of factors includes photographic subject matter orientation (e.g., a portrait orientation or a landscape orientation).

In certain embodiments, analyzing 606 the central region includes placing greater emphasis on those factors that are more indicative of the nature of the photographic subject matter. For example, the presence of faces may be more indicative of the nature of the photographic subject matter than the light levels associated with the photographic subject matter, thus greater emphasis may be placed on the presence of faces when analyzing 606 the central region. As another example, the color distribution of the photographic subject matter may be more indicative of the nature of the photographic subject matter than the presence of words, thus greater emphasis may be placed on color distribution when analyzing 606 the central region.

The automatically adjusting camera device then determines whether the photographic subject matter is a text document. If the photographic subject matter is not a text document, then the automatically adjusting camera device applies 610 default camera settings. Default camera settings may be stored in memory and may include default resolution settings, default color scheme settings, and the like. Otherwise, if the photographic subject matter is a text document, then the automatically adjusting camera device proceeds to reduce 612 camera resolution by an initial amount.

Reducing 612 the camera resolution by an initial amount, in one embodiment, includes adjusting settings of an image sensor to reduce the number of pixels captured by the image sensor. In other embodiments, reducing the camera resolution includes adjusting storage settings of the automatically adjusting camera device to reduce resolution of captured image data to a predetermined lower resolution. Reducing 612 the camera resolution may further include compressing captured image data to a lower resolution. In some embodiments, the camera resolution is reduced 612 subsequent to the shutter press, but prior to capturing image data corresponding to the photographic subject matter. In other embodiments, the camera resolution is reduced 612 subsequent to capturing image data, but prior to storing a digital photograph in a non-volatile storage medium, such as the storage device 112.

Next, the automatically adjusting camera device determines 614 whether the text in the text document is legible. In some embodiments, an optical character recognition analysis is performed on the reduced-resolution image data to determine 614 text legibility. If the text document remains legible, then the automatically adjusting camera device reduces 616 the resolution of the image data by an additional amount. Otherwise, if the text document is illegible, then the automatically adjusting camera device increases 618 the camera resolution.

Reducing 616 the resolution by an additional amount may include reducing the resolution by a smaller amount than the initial amount. In some embodiments, the legibility of the text is again assessed after reducing 616 the resolution. In certain embodiments, reducing 616 the resolution by an additional amount includes progressively reducing the resolution and assessing the text legibility until a predetermined resolution is reached or until the text is no longer legible.

Increasing 618 the resolution, in some embodiments, includes returning the resolution to its original state. In other embodiments, increasing the resolution includes increasing the resolution to an intermediate state between the original resolution and the initial reduced resolution. The method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    an image sensor;
    a processor;
    an image module that receives sensor input of photographic subject matter;
    a subject matter module that determines whether a nature of the photographic subject matter is text;
    a configuration module that dynamically selects a lowest number of pixels required to recognize text in the photographic subject matter and alters one or more camera settings to capture a low-fidelity photograph having the lowest number of pixels required to recognize text in the text document, in response to the nature of the photographic subject matter being text,
    wherein the image sensor captures the low-fidelity photograph using the altered one or more camera settings,
    wherein the image module, the subject matter module, and the configuration module each comprise one or more of a hardware circuit, a programmable logic device, and executable code, the executable code stored on one or more non-transitory computer readable storage media.

2. The apparatus of claim 1, further comprising a manual event module that receives a shutter input, wherein the subject matter module determines whether the nature of the photographic subject matter is text in response to the manual event module receiving the shutter input, wherein the manual event module comprises one or more of a hardware circuit, a programmable logic device, and executable code, the executable code stored on one or more non-transitory computer readable storage media.

3. The apparatus of claim 1, further comprising an automatic event module that receives an auto-focus indication, wherein the subject matter module determines whether the nature of the photographic subject matter is text in response to receiving the auto-focus indication, wherein the automatic event module comprises one or more of a hardware circuit, a programmable logic device, and executable code, the executable code stored on one or more non-transitory computer readable storage media.

4. The apparatus of claim 1, wherein dynamically selecting a lowest number of pixels required to recognize text in the photographic subject matter comprises:
reducing a number of pixels captured by the image module by an initial amount and determines whether text in the sensor input is computer readable,
reducing the number of pixels captured by the image module by an additional amount in response to the text document being computer readable, and
increasing the number of pixels captured by the image module in response to the text not being computer readable.

5. The apparatus of claim 1, further comprising a user notification module that prompts a user to allow alteration of the camera setting to capture a low-fidelity photograph, wherein the configuration module alters the camera setting to capture a low-fidelity photograph in response to the user allowing alteration of the camera setting to capture a low-fidelity photograph, wherein the user notification module comprises one or more of a hardware circuit, a programmable logic device, and executable code, the executable code stored on one or more non-transitory computer readable storage media.

6. The apparatus of claim 1, further comprising an image center module that identifies a central region of the sensor input, wherein determining whether a nature of the photographic subject matter is text comprises the subject matter module performing, on the central region of the sensor input, one or more analyses selected from the group consisting of: optical character recognition, facial recognition, color distribution analysis, and light level analysis, wherein the image center module comprises one or more of a hardware circuit, a programmable logic device, and executable code, the executable code stored on one or more non-transitory computer readable storage media.

7. A method comprising:
receiving, by use of a processor, sensor input of photographic subject matter;
determining, by use of a processor, whether a nature of the photographic subject matter is a text document; and
altering, by use of a processor, one of an image property for fidelity and a camera setting for fidelity to capture a low-fidelity photograph, in response to the nature of the photographic subject matter being a text document, wherein altering one of an image property for fidelity and a camera setting for fidelity to capture a low-fidelity photograph comprises dynamically selecting a lowest number of pixels required to recognize text in the text document.

8. The method of claim 7, further comprising receiving a shutter input, wherein determining whether the nature of the photographic subject matter is a text document is performed in response to receiving the shutter input.

9. The method of claim 7, further comprising receiving an auto-focus indication, wherein determining whether the nature of the photographic subject matter is a text document is performed in response to receiving the auto-focus indication.

10. The method of claim 7, further comprising:
prompting a user to allow alteration of the one of an image property for fidelity and a camera setting for fidelity to capture a low-fidelity photograph, in response to the nature of the photographic subject matter being a text document; and
altering one of an image property for fidelity and a camera setting for fidelity to capture a low-fidelity photograph, in response to the user allowing alteration of the one of an image property for fidelity and a camera setting for fidelity to capture a low-fidelity photograph.

11. The method of claim 7, wherein altering one of an image property for fidelity and a camera setting for fidelity to capture a low-fidelity photograph comprises reducing a number of pixels included in captured image data.

12. The method of claim 7, wherein dynamically selecting a lowest number of pixels required to recognize text in the text document comprises:
reducing the number of pixels included in captured image data by an initial amount;
determining whether the text document is computer readable;
reducing the number of pixels included in captured image data by an additional amount in response to the text document being computer readable; and
increasing the number of pixels included in captured image data in response to the text document not being computer readable.

13. The method of claim 7, wherein determining whether the nature of the photographic subject matter is a text document comprises:
performing optical character recognition on at least a portion of the sensor input; and
identifying the photographic subject matter as being a text document in response to successfully recognizing characters in the sensor input.

14. The method of claim 13, wherein performing optical character recognition on at least a portion of the sensor input comprises:
identifying a central region of the sensor input; and
performing optical character recognition on the central region.

15. The method of claim 7, wherein altering one of an image property for fidelity and a camera setting for fidelity to capture a low-fidelity photograph further comprises altering an image property selected from the group consisting of: an image color depth, an image color scheme, and an image file size.

16. The method of claim 7, wherein altering one of an image property for fidelity and a camera setting for fidelity to capture a low-fidelity photograph further comprises altering a camera setting selected from the group consisting of: an image color depth, a camera color setting, an output file size, and an output file type.

17. The method of claim 7, wherein determining whether the nature of the photographic subject matter is a text document comprises performing, on at least a portion of the sensor input, one or more analyses selected from the group consisting of: facial recognition, color distribution analysis, and light level analysis.

18. A program product comprising a non-transitory computer readable storage medium that stores code executable by a processor to perform:
receiving sensor input of photographic subject matter via an image sensor;
prompting a user to allow alteration of an image property for image size;

determining whether a nature of the photographic subject matter is text, in response to the user allowing alteration of the image property for image size;

reducing the number of pixels included in captured image data by an initial amount in response to determining that the nature of the photographic subject matter is text;

determining whether the text is computer readable;

reducing the number of pixels included in captured image data by an additional amount in response to the text being computer readable; and increasing the number of pixels included in captured image data in response to the text not being computer readable.

19. The program product of claim 18, the code further comprising identifying a central region of the sensor input, wherein determining whether a nature of the photographic subject matter is text comprises performing, on the central region of the sensor input, one or more analyses selected from the group consisting of: optical character recognition, facial recognition, color distribution analysis, and light level analysis.

20. The program product of claim 18, the code further comprising receiving an auto-focus indication, wherein determining whether the nature of the photographic subject matter is a text document is performed in response to receiving the auto-focus indication.

\* \* \* \* \*